United States Patent

Khosrowpour

Patent Number: 6,154,802
Date of Patent: Nov. 28, 2000

[54] REDUNDANT BUS BRIDGE SYSTEMS AND METHODS USING SEPARATELY-POWERED BUS BRIDGES

[75] Inventor: Farzad Khosrowpour, Lyons, Colo.

[73] Assignee: Adaptec, Inc., Milpitas, Calif.

[21] Appl. No.: 09/062,278

[22] Filed: Apr. 17, 1998

[51] Int. Cl.$^7$ ...................................................... G06F 13/00
[52] U.S. Cl. ................................................ 710/128; 714/4
[58] Field of Search .................................. 710/128, 129, 710/131; 714/4, 11, 14, 43, 56

[56] References Cited

U.S. PATENT DOCUMENTS

| | | | |
|---|---|---|---|
| 4,255,234 | 3/1981 | Neuner et al. | 376/254 |
| 4,808,994 | 2/1989 | Riley | 340/825.57 |
| 5,485,576 | 1/1996 | Fee et al. | 714/56 |
| 5,678,005 | 10/1997 | Taylor | 709/224 |
| 5,798,658 | 8/1998 | Werking | 326/83 |
| 5,809,543 | 9/1998 | Byers et al. | 711/162 |
| 5,974,502 | 10/1999 | DeKoning et al. | 711/114 |

OTHER PUBLICATIONS

PCI to PCI bridge architecture spec, Revision 1.0, Apr. 5, 1994.

*Primary Examiner*—Ayaz R. Sheikh
*Assistant Examiner*—David A. Wiley
*Attorney, Agent, or Firm*—Duft, Graziano & Forest, P.C.

[57] ABSTRACT

A redundant bus bridge system includes first and second bus bridges operative to transfer data between a first bus and a second bus, the first and second bus bridges being configured to receive power from respective separate power supplies. In one embodiment, the first bus bridge and the second bus bridge share a common ground reference. The first bus bridge may be included in a first circuit assembly configured to receive power at a power supply voltage. The second bus bridge may be included in a second circuit assembly including a input circuit having a maximum input voltage associated therewith. The first circuit assembly may be operative to apply an output signal to the input circuit of the second circuit assembly, the output signal having a voltage which varies with the power supply voltage but does not exceed the maximum input voltage. To achieve this, the first circuit assembly may include a voltage regulator configured to receive power at a the power supply voltage and operative to produce a regulated power supply voltage which is less than the power supply voltage, and an output circuit responsive to the voltage regulator and operative to receive power at the regulated power supply voltage and to produce the output signal therefrom. According to another aspect, the first and second circuit assemblies are operative to prevent power transfer to one another. Related operating methods are also discussed.

20 Claims, 3 Drawing Sheets

REDUNDANT BUS BRIDGE SYSTEMS AND METHODS USING SEPARATELY-POWERED BUS BRIDGES

BACKGROUND OF THE INVENTION

1. Field of the Invention

The present invention relates to data communications systems and methods, and more particularly, to bus bridge systems and methods.

2. Statement of the Problem

High bandwidth busses are typically used to communicate between hosts and peripherals in applications such as computer networks. The bus interfaces used by hosts and peripherals often take different forms depending on the performance characteristics desired. For example, host devices may communicate via a differential or single ended Small Computer System Interface (SCSI) or a Fibre Channel (FC) interface, while a peripheral such as a disk array may utilize a SCSI or other bus interface. When hosts and peripherals use disparate bus architectures, bus bridges are often utilized to provide connectivity.

Bus bridges may also be used to increase the capacity of bus systems. Bus specifications often limit, among other things, the length of the bus and the number of devices that may be attached to the bus in order to maintain performance. For example, the Peripheral Component Interconnect (PCI) bus specification commonly employed in personal computer bus applications has detailed rules for round trip propagation delay and capacitive loading which help maintain the integrity of communications at specified bus clock rates. In order to increase the capacity of such a bus, an expanded multilayer bus structure may be used that includes a plurality of busses connected by high-speed bus bridges. This multilayer structure can allow an increased number of devices to be interconnected while maintaining bus performance.

Complex computer systems and networks may employ multiple hosts connected to peripherals such as mass storage devices. These devices often are connected to the hosts by multiple busses and bus bridges. Consequently, data stored on these mass storage systems may be temporarily inaccessible due to a bus bridge failure, an event that can incur significant down time costs. In addition, systems that utilize bridges with storage elements, such as caches used in for Redundant Array of Independent Disk (RAID) systems that implement data striping or mirroring across multiple disks or other storage media, may be subject to data loss or corruption if the coherence of the cache is lost due to a bridge failure. Accordingly, it is desirable to increase the reliability of bus bridges to help reduce the likelihood of information loss.

Conventional approaches to increasing the reliability of bus bridge systems include so-called "N+1" power supply redundancy. According to such a scheme, a power source for a data communications system includes a ganged plurality of power supplies, typically supplying a common bus. The common bus is fed by a number of supplies sufficient to supply the load presented by the bus bridges and other components of the system, assuming all components are operational, as well as by an additional power supply, i.e., an "N+1st" power supply. Should one power supply fail, sufficient capacity should remain to keep the system operational. According to the theory of operation of such systems, the likelihood of multiple power supplies failing is relatively low, and therefore the additional N+1st supply provides sufficient redundancy.

Unfortunately, however, an N+1 system can have undesirable characteristics and may not be suitable for all applications. N+1 systems typically tie a plurality of power supplies to a common bus, and thus can present current sharing problems as well as vulnerability to failure of the common bus. In addition, some RAID controller systems are sold as discrete units that include one or more bus bridges and associated power supplies, and are not designed to supply power to other peripheral devices such as disk arrays. Providing N+1 redundancy in such systems can be wasteful. Accordingly, there is a need for alternative techniques for increasing reliability in redundant bus bridge systems.

SUMMARY OF THE INVENTION

In light of the foregoing, it is an object of the present invention to provide bus bridge systems and methods that can provide increased reliability and data protection.

This and other objects, features and advantages are provided according to the present invention by bus bridge systems and methods in which first and second bus bridges in a redundant bus bridge system are powered by separate power supplies. Preferably, the first and second bus bridges are included in respective first and second circuit assemblies configured to connect to separate first and second power supplies. In one embodiment according to the present invention, the first and second bus circuit assemblies share a common ground reference, and communications between therebetween are protected by level-shifting signals conveyed between the assemblies to a lower voltage level which ensures that the maximum input voltages of input circuits in the assemblies are not exceeded when power supply voltages drift, e.g., by using devices such as LCX-family transceivers which are compatible with a range of logic voltages. In another embodiment according to the present invention, each circuit assembly is operative to prevent power transfer to the other circuit assembly, thus providing a mechanism for a surviving operational bus bridge to shut down a companion bus bridge having, for example, a short circuit. The reciprocal power supply control may be provided using addressable switches, thus increasing immunity to inadvertent glitch or noise triggered power shutdowns.

Providing separate power supplies for each bus bridge can lead to more efficient power supply usage, especially in those disk controller or similar bus bridge systems that are not designed to supply power to disk drives or other peripheral devices. Using separate supplies also reduces current sharing and bus failure problems that can arise in systems that tie a plurality of power supplies to a common power bus.

In particular, according to the present invention, a redundant bus bridge system includes a first bus bridge connecting a first bus and a second bus and operative to transfer data therebetween. A second bus bridge is connecting the first bus and the second bus and is operative to transfer data therebetween. The first bus bridge and the second bus bridge are configured to receive power from respective separate power supplies.

In one embodiment according to the present invention, a first conductor assembly is configured to connect the first bus bridge to a first power supply, and a second conductor assembly is configured to connect the second bus bridge to a second power supply. The first and second conductor assemblies may include respective first and second sets of conductors in a backplane.

In another embodiment according to the present invention, the first bus bridge and the second bus bridge share a common ground reference. The first bus bridge may be included in a first circuit assembly configured to receive power at a power supply voltage. The second bus bridge may be included in a second circuit assembly including an input circuit having a maximum input voltage associated therewith. The first circuit assembly may be operative to apply an output signal to the input circuit of the second circuit assembly, the output signal having a voltage which varies with the power supply voltage but does not exceed the maximum input voltage. To achieve this, the first circuit assembly may include a voltage regulator configured to receive power at a the power supply voltage and operative to produce a regulated power supply voltage which is less than the power supply voltage, and an output circuit responsive to the voltage regulator and operative to receive power at the regulated power supply voltage and to produce the output signal therefrom.

According to another aspect of the present invention, the first and second bus bridges are included in respective first and second circuit assemblies, and the first circuit assembly is operative to prevent power transfer to the second bus bridge. The second circuit assembly may include a switch configured to connect the second bus bridge to a power supply, the switch having a first state in which power transfer to the second bus bridge is enabled and a second state is which power transfer to the second bus bridge is disabled. The first circuit assembly may be operative to transition the switch between the first state and the second state. According to another aspect, the first circuit assembly may be operative to enable and disable a power supply connected to the second circuit assembly. More reliable bus bridge operation may thereby be provided.

DETAILED DESCRIPTION OF EMBODIMENTS

Figure 1:
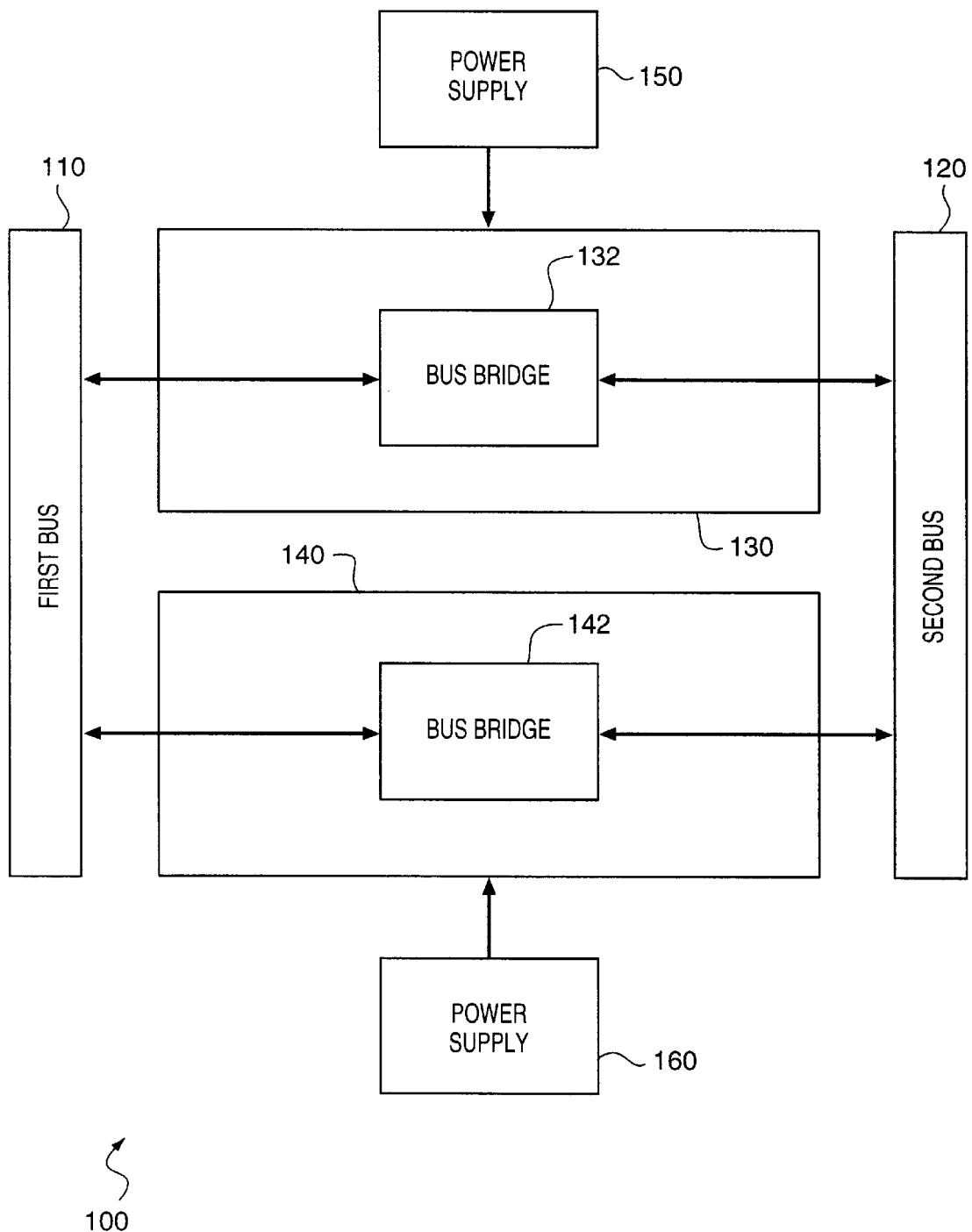
FIG. 1 illustrates an embodiment of a redundant bus bridge system according to the present invention.

The present invention now will be described more fully hereinafter with reference to the accompanying drawings, in which embodiments of the invention are shown. Those skilled in the art will appreciate that the invention may be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

It will be understood that as referred to herein, a "bus" may include a conductive, fiber optic or similar pathway for transmission of information from one location to another. For purposes of the discussion herein, busses include but are not limited to parallel and series data paths such as low voltage differential (LVDS) or single ended (SE) SCSI, Fibre Channel (FC) and the like. A "bus bridge" according to the present invention may include hardware or combinations of hardware and software that provide connectivity between such busses. Accordingly, a bus bridge may include intermediate busses or other data paths that are used to provide connectivity between busses; for example, embodiments are described herein that include bus bridges including intermediate busses, e.g., PCI busses, which are used to provide connectivity between two other types of busses, such as between a Fibre Channel "bus" and an SCSI bus.

FIG. 1 illustrates an embodiment of a redundant bus bridge system 100 according to the present invention. First and second bus bridges 132, 142 in respective first and second circuit assemblies 130, 140 are operative to transfer data between a first bus 110 and a second bus 120. The first and second bus bridges 132, 142 are powered by respective separate first and second power supplies 150, 160. Accordingly, when, for example, the first power supply 150 fails, the second bus bridge 142 may remain operational.

Figure 2:
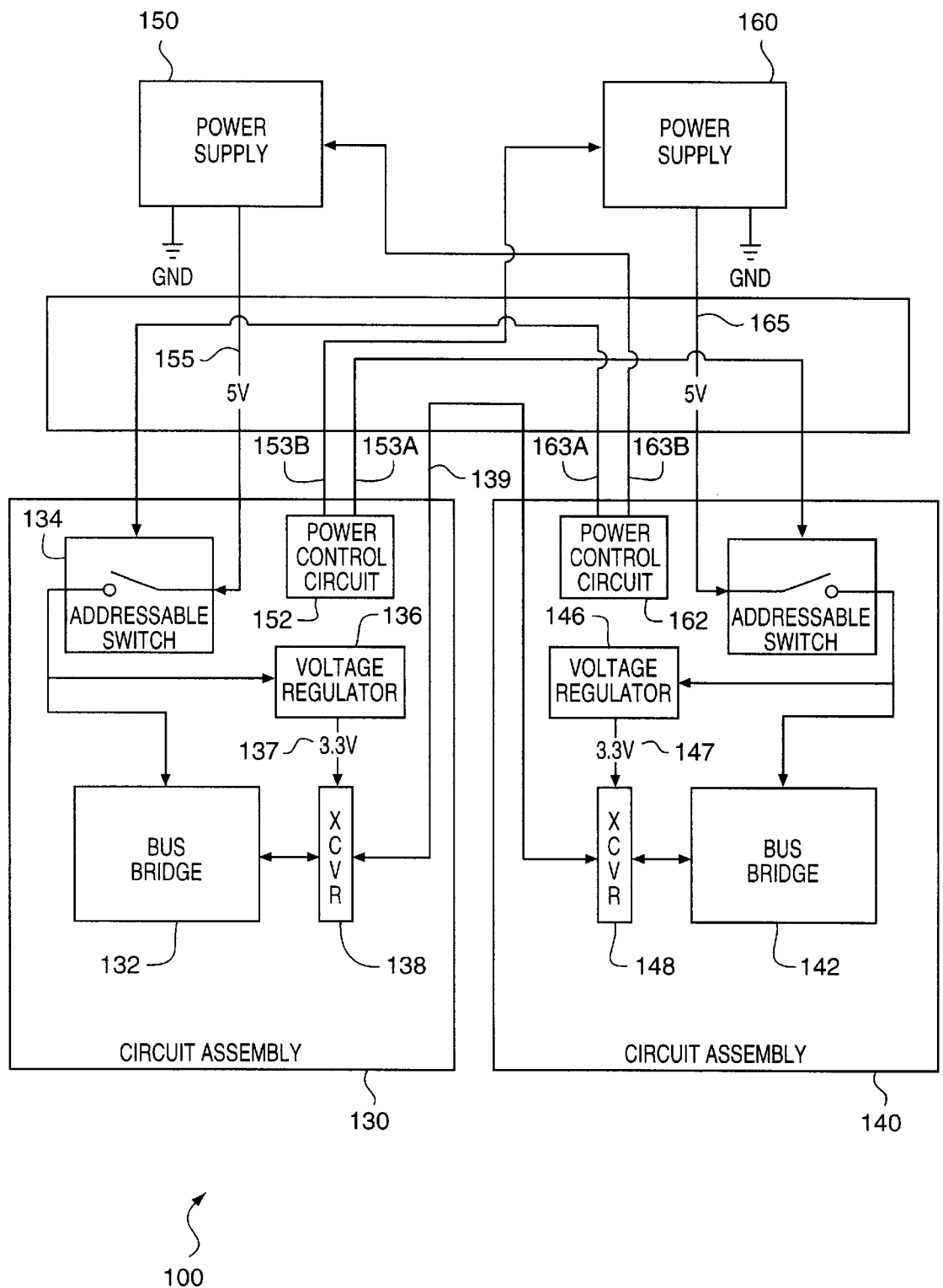
FIG. 2 illustrates another embodiment of a redundant bus bridge system according to the present invention.

As shown in greater detail in FIG. 2, the first and second power supplies 150, 160 are preferably tied to a ground plane or conductor GND, thus providing a common ground reference for the first and second bus bridges 132, 142. The first and second power supplies are connected to respective first and second circuit assemblies 130, 140 including respective first and second bus bridges 132, 142, via a conductor assembly, e.g. respective first and second sets of conductors in a backplane 210.

According to one aspect of the present invention, provision is made to ensure that drift in the output voltages 155, 165 produced by the first and second power supplies 150, 160 does not cause overvoltage or logic ambiguity problems for signals conveyed between the first and second circuit assemblies 130, 140. A respective one of the circuit assemblies 130, 140 includes a respect voltage regulator 136, 126 which produces a regulated voltage 137, 147 that is less than the power supply voltage 155, 165; as shown here, the regulators 136, 147 produce a nominal 3.3 volts from a nominal 5 V supply. The reduced voltage supply is used to power output circuits, such as those in transceivers 138, 148 that apply signals 139 between the circuit assemblies 130, 140. The regulated voltage 137, 147 is such that signals applied to input circuits, e.g., such as those in the transceivers 138, 148, do not exceed the maximum input voltage rating associated with the input circuits, even though variation in the power supply voltages 155, 165 may cause output signals 139 to exceed the nominal regulated voltages 137, 147. For example, the transceivers 138, 148 may include devices such as low voltage bi-directional registered transceivers implemented in so-called "LCX" low-power CMOS technology, such as the QS74LCX16646 transceivers manufactured by Quality Semiconductor, Inc. which are operate at low-voltage TTL logic levels but which are also compatible with higher 5 volt logic levels. According to a related aspect of the present invention, the input circuits for signals 139 conveyed between the first and second circuit assemblies 130, 140, i.e., the transceivers 138, 148 also provide a high impedance when in a de-energized state, thus protecting the output circuits of a surviving circuit assembly should one of the circuit assemblies 130,140 be de-energized.

According to another aspect of the present invention, the circuit assemblies 130, 140 may be operative to control power transfer to one another in such a way that noise, glitches or a failure on one of the circuit assemblies 130, 140 does not inadvertently shut down a circuit assembly. In one embodiment, an addressable switch 134, 144 is provided on each circuit assembly 130, 140, connecting the assembly to one of the power supplies 150, 160. The addressable switch 134 on a first circuit assembly 130 may be responsive to a control signal 153a produced by a power control circuit 162 included in a second circuit assembly 140. Similarly, the addressable switch 144 on the second circuit assembly 140 is responsive to a control signal 163a produced by a power control circuit 152 included in the first assembly 140. The power control circuits 152, 162 are operative to transition the switches 134, 144 between on and off states, thus provided a mechanism for preventing transfer of power to a bus bridge should, for example, a short circuit develop on one of the circuit assemblies. Those skilled in the art will appreciate that the power control circuits 152, 162 may be implemented using a number of different circuits and devices including, for example, discrete logic circuits, programmable logic devices, buffers driven from a microprocessor and the like which are operative to produce the control signals 153a, 163a.

Using an addressable switch, e.g., a switch operated by a register, memory location or other similarly addressable location, can decrease the likelihood of an inadvertent shutdown of an assembly. For example, if simple binary logic control lines were used to provide power control between the circuit assemblies 130, 140, a glitch could be induced on such a binary power control line when one of the circuit assemblies 130,140 is powered up, as might occur when a failed assembly is replaced. If simple control logic were utilized, this glitch could trigger an unintended shutdown of an existing assembly. By utilizing an addressable switch, the likelihood of such a glitch-induced shutdown can be significantly reduced.

Alternatively or in addition to providing an addressable switch on each of the assemblies 130, 140, the power control circuits 152, 162 may be operative to enable or disable the power supplies 150,160, thus providing another mechanism for a surviving circuit assembly to prevent power transfer to a failed circuit assembly. As shown in FIG. 2, control signals 153b, 163b may be directly provided to the power supplies 150, 160. Alternatively, buffering may be used to improve glitch and noise immunity. For example, as illustrated in FIG. 4, a respective control signal 153, 163 from a respective circuit assembly 130, 140 may be provided to an addressable switch 154, 164 and a communications circuit 156, 166 on another circuit assembly, the communications circuit 156, 166 providing a control message to a respective one of the power supplies 150, 160 via a communications bus 158, 168. The communications circuits 156, 166 may comprise a variety of circuits capable of communicating over a variety of types of communications busses, detailed knowledge of which is unnecessary to the understanding of the nature of the present invention. Buffering power supply control in this manner can reduce the likelihood of inadvertent glitch or noise induced shutdowns.

Those skilled in the art will appreciate that the present invention is generally applicable to a variety of bus bridge applications. In an embodiment of a bus bridge system 100 illustrated in FIG. 3, the first and second bus bridges may include respective first and second RAID controllers 132, 142 which provide connectivity between a host, here shown as a hub 101 for a Fibre Channel (FC) "bus" 110, and a disk array 102, here shown connected to a SCSI bus 120. Information transfer between the FC bus 110 and the SCSI bus 110 may occur according to at least one of a so-called RAID "level," for example, the RAID levels described in *The RAIDbook, A Source Book for Disk Array Technology,* published by the RAID Advisory Board, St. Peter Minn. (1996).

Those skilled in the art will appreciate that the present invention may be employed to provide connectivity between busses other than FC or SCSI. It will also be understood that present invention could be used to provide bus bridge connectivity between sets of busses including multiple busses. For example, the SCSI bus 120 of FIG. 1 could include multiple busses connecting the bus bridge system 100 to a plurality of disks and/or disk arrays. In addition, it will be understood that the disk array 102 may include hardware, software or combinations thereof, such as an array of "physical" disks combined with one or more layers of array management software.

Figure 3:
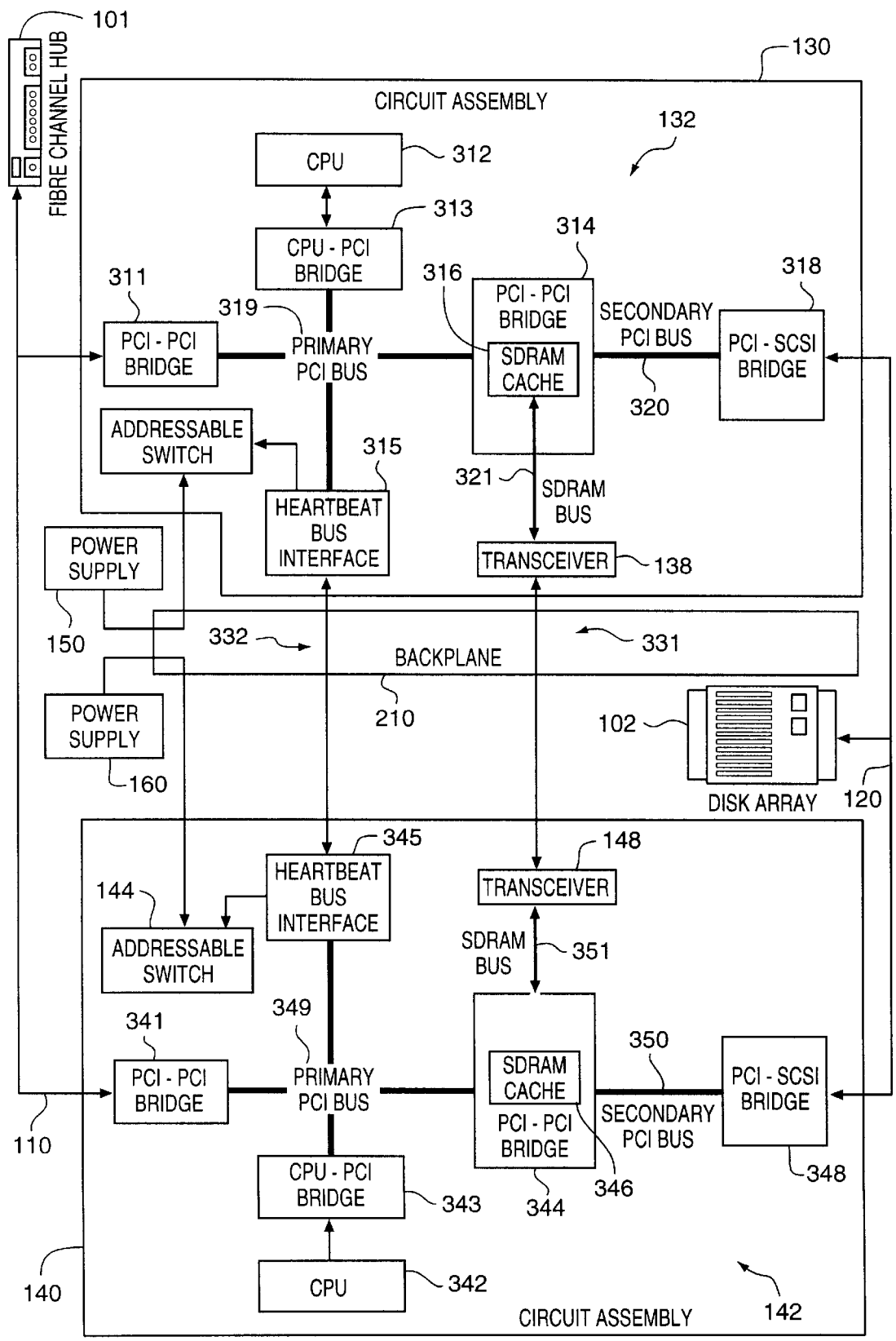
FIG. 3 illustrates yet another embodiment of a redundant bus bridge system according to the present invention.

Still referring to FIG. 3, the first and second controllers 132, 142 are implemented on respective first and second circuit assemblies 130, 140. The first and second circuit assemblies are pluggably connected to a backplane 210. In a respective one of the circuit assemblies 130, 140, a FC-PCI bridge 311, 241 provides connectivity between the FC bus 110 and a primary PCI bus 319, 349. A PCI-PCI bus bridge 314, 344 communicates information between the primary PCI bus 319, 349 and a secondary PCI bus 320, 350 via an SDRAM cache 316, 346. A PCI-SCSI bridge 318, 348 provides connectivity between the secondary PCI bus 320, 350 and the SCSI bus 120 connected to the disk array 102. The SDRAM cache is connected to the PCI-PCI bus bridge 314, 344 by an SDRAM bus 321, 351, and caches information to be transferred between the primary PCI bus 319, 349 and the second PCI bus 320, 350.

A respective circuit assembly 130, 140 includes a transceiver 138, 148 connected to the SDRAM bus 321, 351, such that information cached in the circuit assembly's cache may be redundantly written to the cache of the other, "remote" circuit assembly, thus allowing information cached in a failed or removed circuit assembly to be recovered by retrieving the redundant information from the remote cache. The transceivers 138, 148 include low voltage bidirectional registered transceivers implemented in so-called "LCX" low-power CMOS technology, such as the QS74LCX16646 transceivers manufactured by Quality Semiconductor, Inc.

Each of the circuit assemblies 130, 140 also includes circuitry that allows the assembly to monitor and control the other assembly. A "heartbeat" bus 332 is provided to communicate status information, such as identification or diagnostic information, and commands between the first and second circuit assemblies 130, 140 via heartbeat bus interfaces 315, 345. The heartbeat bus 332 may include a serial bus, for example, with the first and second heartbeat bus interfaces 315, 345 including registers and/or memory devices such as electrically erasable programmable readonly memories (EEPROMs) which may be accessed by either of the circuit assemblies 130, 140 via the serial bus.

Communications between the SDRAM busses 321, 351 and over the heartbeat bus 332 are be controlled by central processing units (CPUs) 312, 342 on the first and second circuit assemblies 210, 240. A respective CPU 312, 342 includes a microprocessor, e.g., a Pentium®-class microprocessor, which communicates with devices on the primary PCI bus 319, 349 via a CPU-PCI bridge 313, 343. Examples of such CPU-PCI bridges are described in *Understanding I/O Subsystems,* published by Adaptec, Inc. (1996).

As shown, each of the circuit assemblies 130, 140 also includes an addressable switch 134, 144 connecting the circuit assembly to one of two power supplies 150, 160. An addressable switch 134 on a first circuit assembly 130 may be controlled by a second circuit assembly 140 via the heartbeat bus 332. For example, the CPU 342 in the second circuit assembly 140 may cause a transition of the addressable switch 134 on the first circuit assembly 130 by communicating an appropriate message through the CPU-PCI bridge 343, the primary PCI bus 349, and the heatbeart bus interface 345 of the second circuit assembly 140, causing appropriate data to be conveyed to a register or memory location in the heartbeat bus interface 315 of the first circuit assembly 130. The addressable switch 134 may then transition to the appropriate state, e.g., on or off, responsive to this register or memory location.

In the drawings and specification, there have been disclosed embodiments of the invention. Although specific terms are employed, they are used in a generic and descriptive sense only and not for purposes of limitation, the scope of the invention being set forth in the following claims. It is expected that persons skilled in the art can and will make, use or sell alternative embodiments that are within the scope of the following claims either literally or under the Doctrine of Equivalents.

That which is claimed is:

1. A redundant bus bridge system for communicating between a first bus and a second bus, the system comprising:

a first bus bridge connecting the first bus and the second bus and operative to transfer data therebetween; and a second bus bridge connecting the first bus and the second bus and operative to transfer data therebetween, wherein said first bus bridge and said second bus bridge are configured to receive power from respective separate power supplies, a first conductor assembly configured to connect said first bus bridge to a first power supply;

a second conductor assembly configured to connect said second bus bridge to a second power supply.

2. A system according to claim 1, wherein said first bus bridge is operative to transfer data between the first bus and the second bus when a power supply configured to supply power to said second bus bridge fails.

3. A system according to claim 2, wherein said second bus bridge is operative to transfer data between the first bus and the second bus when a power supply configured to supply power to said first bus bridge fails.

4. A system according to claim 1, further comprising a backplane including a plurality of conductors, and wherein said first conductor assembly comprises a first set of said conductors and said second conductor assembly comprise a second set of said conductors.

5. A system according to claim 1, wherein said first bus bridge and said second bus bridge share a common ground reference.

6. A system according to claim 5:

wherein said first bus bridge is included in a first circuit assembly configured to receive power at a power supply voltage;

wherein said second bus bridge is included in a second circuit assembly including a input circuit having a maximum input voltage associated therewith; and wherein said first circuit assembly is operative to apply an output signal to said input circuit of said second circuit assembly, said output signal having a voltage which varies with said power supply voltage but does not exceed said maximum input voltage.

7. A system according to claim 6:

wherein said first circuit assembly comprises:

a voltage regulator configured to receive power at a said power supply voltage and operative to produce a regulated power supply voltage which is less than said power supply voltage;

an output circuit responsive to said voltage regulator and operative to receive power at said regulated power supply voltage and to produce said output signal therefrom.

8. A system according to claim 7, wherein said power supply voltage is approximately 5 volts and wherein said regulated power supply voltage is approximately 3.3 volts.

9. A system according to claim 1:

wherein said first bus bridge is included in a first circuit assembly;

wherein said second bus bridge is included in a second circuit assembly; and wherein said first circuit assembly is operative to prevent power transfer to said second bus bridge.

10. A system according to claim 9:

wherein said second circuit assembly comprises a switch configured to connect said second bus bridge to a power supply, said switch having a first state in which power transfer to the second bus bridge is enabled and a second state is which power transfer to the second bus bridge is disabled; and wherein said first circuit assembly is operative to transition said switch between said first state and said second state.

11. A system according to claim 9, wherein said first circuit assembly is operative to enable and disable a power supply connected to said second circuit assembly.

12. A system according to claim 1:

wherein said first bus bridge is included in a first circuit assembly having an output circuit operative to produce an output signal; and wherein said second bus bridge is included in a second circuit assembly including a input circuit configured to receive said output signal from said first circuit assembly, said input circuit operative to provide a high impedance when said second circuit assembly is de-energized.

13. A system according to claim 12:

wherein said output circuit produces an output current and has a maximum output current associated therewith; and wherein said input circuit is operative to provide an impedance when said second circuit assembly is de-energized such that said output current does not exceed said maximum output current.

14. A system according to claim 13, wherein said first bus bridge and said second bus bridge comprise respective first and second RAID controllers.

15. A method of operating a redundant bus bridge system including a first bus bridge and a second bus bridge, each of which connect a first bus and second bus for communications therebetween, the method comprising the steps of:

providing separate first and second power supplies configured to supply power to the first bus bridge and the second bus bridges, respectively;

providing separate first and second conductor assemblies between said first and said second power supplies and said first and said second bus bridges respectively; and transferring data between the first and second bus over at least one of the first bus bridge and the second bus bridge.

16. A method according to claim 15, wherein said step of transferring is followed by the step of:

transferring data over the first bus bridge when the second power supply fails.

17. A method according to claim 15, wherein the first bus bridge is included in a first circuit assembly, wherein the second bus bridge is included in a second circuit assembly, and wherein said step of transferring is followed by the step of producing a signal from the first circuit assembly to prevent power transfer to the second circuit assembly.

18. A method according to claim 17, wherein said step of producing a signal comprises the step of producing a signal to operate a switch on the second circuit assembly.

19. A method according to claim 17, wherein said step of producing a signal comprises the step of producing a signal to disable the second power supply.

20. A method according to claim 15, wherein said step of transferring data comprises the step of transferring data according to a RAID level.

* * * * *